United States Patent
Angermayr et al.

(10) Patent No.: US 7,515,607 B2
(45) Date of Patent: Apr. 7, 2009

(54) IMPLEMENTATION OF LINKSET-RELATED SS7 NETWORK FUNCTIONS BASED ON M3UA MESSAGES

(75) Inventors: Manfred Angermayr, Schrobenhausen (DE); Martin Beermann, Puchheim (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 593 days.

(21) Appl. No.: 11/227,711

(22) Filed: Sep. 15, 2005

(65) Prior Publication Data
US 2006/0064475 A1 Mar. 23, 2006

(30) Foreign Application Priority Data
Sep. 16, 2004 (EP) ................... 04022108

(51) Int. Cl.
*H04J 3/16* (2006.01)
(52) U.S. Cl. ..................... 370/466
(58) Field of Classification Search ............. 370/466, 370/401; 709/223, 230, 220
See application file for complete search history.

(56) References Cited

U.S. PATENT DOCUMENTS

| | | | | |
|---|---|---|---|---|
| 6,990,089 B2 * | 1/2006 | Benedyk et al. | ............. | 370/338 |
| 6,990,347 B2 * | 1/2006 | McCann | ............. | 455/445 |
| 7,136,477 B2 * | 11/2006 | Craig et al. | ............. | 379/230 |
| 7,318,091 B2 * | 1/2008 | Brendes et al. | ............. | 709/223 |
| 7,346,066 B2 * | 3/2008 | Nealon | ............. | 370/401 |
| 2004/0068534 A1 | 4/2004 | Angermayr et al. | | |

FOREIGN PATENT DOCUMENTS

WO   WO 02/28060 A1   4/2002
WO   WO 02/076112 A1  9/2002

OTHER PUBLICATIONS

G. Sidebottom, K. Morneault, J. Pastor-Balbas, RFC 332 Signaling System 7 (SS7) Message Transfer Part 3 (MTP3)—User Adaptation Layer (M3UA), Network Working Group, Sep. 2002, pp. 1-120, XP-002247869.
Performance Technologies, "Tutorial: Interworking Switched Circuit and Voice-over-IP Networks", Aug. 22, 2001, pp. 1-14, XP-002253253.

* cited by examiner

*Primary Examiner*—Chi H Pham
*Assistant Examiner*—Albert T Chou
(74) *Attorney, Agent, or Firm*—Bell, Boyd & Lloyd LLP

(57) ABSTRACT

The present invention relates to a method and network element for providing linkset-related SS7 network functions based on M3UA messages. In particular the present invention provides a method and a signaling gateway (108) for implementing screening based on M3UA messages by mapping M3UA connections to pseudo linksets (116) to which linkset-related rules can then be applied.

8 Claims, 1 Drawing Sheet

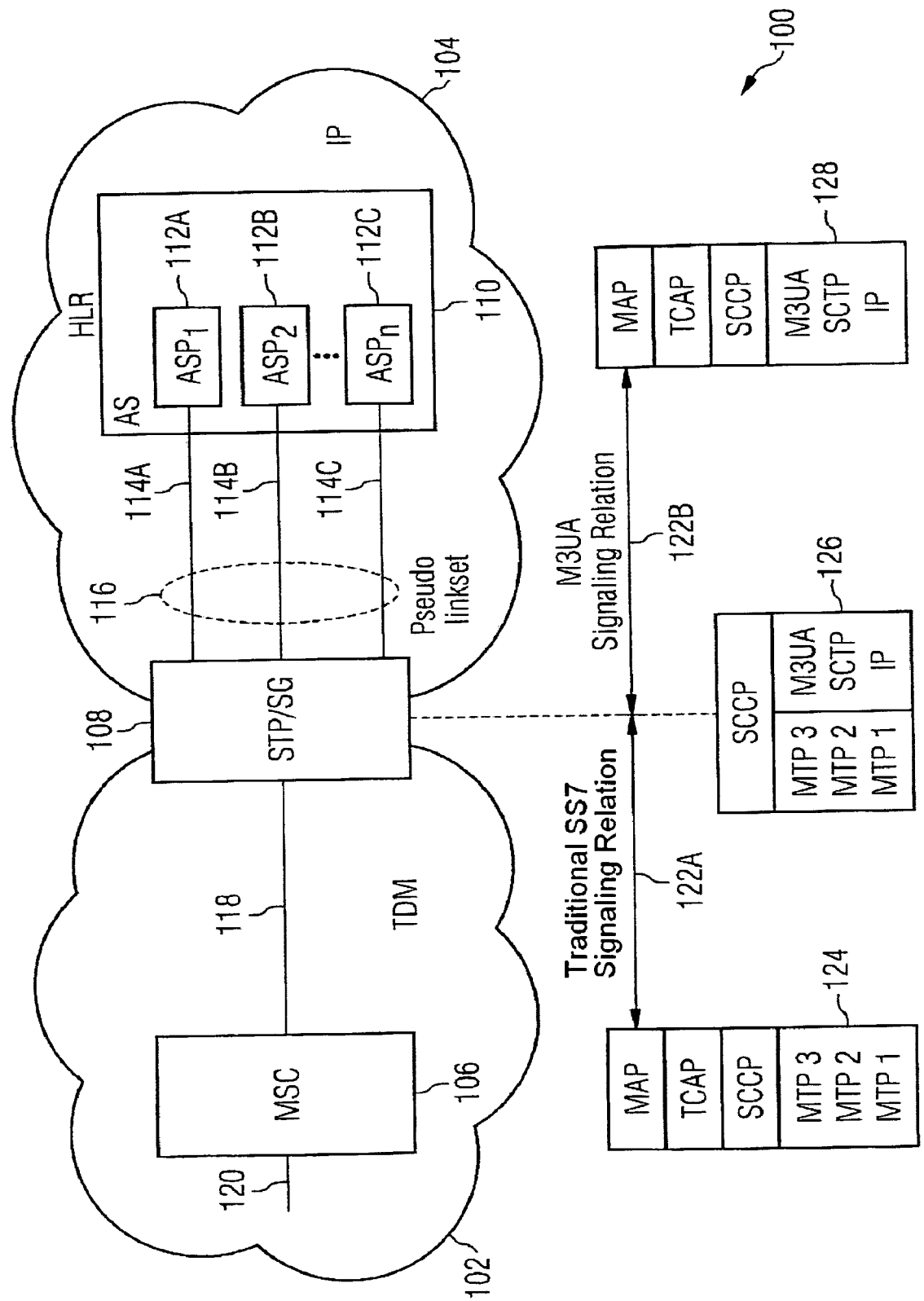

IMPLEMENTATION OF LINKSET-RELATED SS7 NETWORK FUNCTIONS BASED ON M3UA MESSAGES

CROSS REFERENCE TO RELATED APPLICATIONS

This application claims priority to the European application No. 04022108.7, filed Sep. 16, 2004 and which is incorporated by reference herein in its entirety.

FIELD OF INVENTION

The present invention relates to a method and network element for providing linkset-related SS7 network functions based on M3UA messages. In particular the present invention provides a method and a signaling gateway for implementing screening based on M3UA messages.

SUMMARY OF THE INVENTION

Modern communication networks normally transport two types of traffic or data. The first type is traffic which is sent or received by users or subscribers, with the user or subscriber frequently being billed for the transmission thereof. This traffic is also known as user traffic, user data or subscriber traffic. The second type is traffic originated by network management and frequently called management traffic.

In the field of telecommunications, management traffic is also called signaling traffic. The term "signaling" here relates to the exchange of signaling messages between different network elements such as database servers, local switching centers, transit switching centers and user terminals. A widely known protocol for transmitting signaling information is Signaling System 7 (SS7), frequently also called Central Signaling System No. 7 (ZZS7) or Common Channel Signaling System 7 (CCS7).

Signaling System 7 is standardized by the International Telecommunication Union (ITU) in standard series Q.7xx and meets all signaling requirements of modern telecommunication networks.

Signaling System 7 here forms an independent network, in which SS7 messages are exchanged between the network elements via two-way channels called links. Signaling takes place out-of-band rather than in-band on channels reserved for user data (e.g. voice). Besides faster call setup times, this also permits a range of functions, for example Intelligent Network (IN) services, which can run in the signaling network without parallel user data connections having to be set up.

The elements of an SS7 network are called signaling points, and are uniquely identified by a signaling point code (SPC). These point codes are transmitted between signaling points in the signaling messages and in each case designate the source and destination of a message. Each signaling point uses a routing table to select an appropriate signaling path for each message.

Three types of signaling points are distinguished in SS7 networks: Service Switching Points (SSPs), Signaling Transfer Points (STPs) and Service Control Points (SCPs).

SSPs are switching centers from which calls originate, at which calls end or which forward calls as transit switching centers (frequently as "tandems"). An SSP sends signaling messages to other SSPs to set up, manage and clear down (voice) circuits which are required for a call. An SSP can also interrogate centralized databases (SCPs) to determine how a call should be routed (in the case of toll-free calls, for example). An SCP sends a reply to the inquiring SSP, containing the routing number associated with the number dialed.

Network traffic between signaling points can be routed via signaling transfer points (STPs). An STP forwards each incoming message on the basis of the routing information contained in the SS7 message to an outgoing signaling link. Since an STP acts as a central network node, it makes better use of the SS7 network, since it obviates the need for direct links between signaling points. An STP can execute "Global Title Translation", a procedure by which the destination is determined from the number digits contained in the signaling message (e.g. the called toll-free number, the number of a calling card or the ID of a cell phone user MSIN).

Signaling System 7 uses a protocol stack in which the hardware and software functions of the SS7 protocol are divided into functional abstractions, called levels. These levels can be mapped with certain restrictions to the Open Systems Interconnect (OSI) 7-layer model or the layer model of the International Standards Organization (ISO).

The lower three levels are called the Message Transfer Part (MTP). MTP Level 1 defines the physical, electrical and functional attributes of the digital signaling link. MTP Level 2 ensures correct end-to-end transmission of a message via a signaling link. MTP Level 3 routes messages between signaling points of the SS7 network.

Functions are provided in SS7 by so-called user parts. A frequently used user part is the ISDN User Part (ISUP), which defines the protocol used to occupy, manage and release lines that transport the user traffic between switching centers (e.g. between the caller and the called party). In some countries the less powerful Telephone User Part (TUP) is used instead of the ISUP.

Another SS7 protocol, the Signaling Connection Control Part (SCCP), provides connection-free and connection-oriented network services and Global Title Translation (GTT) above MTP Level 3. The SCCP is used as a transportation level for TCAP-based services.

The Transaction Capabilities Applications Part (TCAP) supports the exchange of non-voice-circuit-related data between applications in the SS7 network using the connection-free SCCP. Queries and responses exchanged between SSPs and SCPs are transported in TCAP messages. In mobile communication networks the TCAP transports messages of the Mobile Application Part (MAP) exchanged between mobile switching centers and databases to assist with user authentication, device identification and roaming by subscribers.

In traditional telecommunication networks all user parts use MTP Level 3 to transport messages, MTP Level 3 for its part relying on Levels 2 and 1 to provide transportation and to implement link management.

Current developments are aimed at replacing signaling based on exclusive and hence expensive lines by services based on the Internet Protocol (IP). However, if IP is used instead of MTP Level 1, the previously used MTP Level 2 also needs to be replaced. The Internet Engineering Task Force (IETF) hence specified in RFC 3332 the MTP3 User Adaptation Layer (M3UA) protocol based on the Stream Control Transmission Protocol (SCTP) and which replaces MTP Levels 2 and 3.

The aim of the M3UA/SCTP/IP combination is to create the possibility, analogously with MTP Level 3 in traditional SS7 networks, of transporting messages of the user parts between SS7 signaling gateways (SG), media gateway controllers (MGC) or IP-based databases.

One problem is that the M3UA protocol architecture does not support the linksets known from the traditional MTP Level 3. One result of this is that screening of Level 3 message signaling units (MSUs) is not possible. However, because the networks of many telecommunication providers are linked by means of a higher-level SS7 network, screening is increasingly required so that a network operator can prevent unauthorized use of his resources by other network operators. To this end incoming MTP Level 3 MSUs are largely examined in STPs and forwarded to their destination or rejected using screening rules. A known and frequently used screening standard is laid down in STP Generic Requirements, GR-82-CORE, Annex C from Telcordia Technologies (also called "Bellcore Screening").

One object of the present invention is hence to specify a method and a network element which permit the implementation of linkset-related SS7 network functions, in particular screening, based on M3UA messages.

This object is achieved by a method for implementing linkset-related SS7 network functions based on messages according to M3UA, with the following steps:

in a setup phase, mapping M3UA connections to pseudo linksets, a pseudo linkset being defined as the set of M3UA connections between a signaling gateway and an application server and uniquely determined by a set of SS7 parameters and parameter values, the parameters and parameter values uniquely laying down the scope of the traffic processed by the application server;

in the setup phase, storing the data describing the pseudo linksets as linkset data in a database; and in an operating phase, implementing the linkset-related SS7 network functions by determining an assigned pseudo linkset and applying the SS7 network functions to the messages of the M3UA connection determined using the database.

The invention further relates to a signaling gateway with means for executing this method.

Advantageous embodiments are specified in the dependent claims.

One advantage of the invention is that, thanks to the invention, functions requiring the traditional SS7 linksets, for example screening at MTP level or M3UA level, can now also be implemented in SS7 networks based on M3UA.

If in an existing, traditional SS7 network a TDM-based STP is replaced in the course of converting to SS7 over IP using M3UA by a signaling gateway, advantageously the existing database of the previously used screening rules can still be used, since the M3UA connections are mapped as linksets according to the invention.

Preferred embodiments of the present invention are explained in greater detail below, in conjunction with a drawing. Terms relating to M3UA are here used in conformity with the meanings defined in RFC 3332, unless specified otherwise (see section 1.2 of RFC 3332).

BRIEF DESCRIPTION OF THE DRAWINGS

The single FIGURE shows a network made up of a traditional telecommunication network, namely the TDM network and an IP-based telecommunication network.

DETAILED DESCRIPTION OF THE INVENTION

The single FIGURE shows a network 100 made up of a traditional telecommunication network, namely the TDM network 102 and an IP-based telecommunication network 104.

At the interface between the networks 102 and 104 there is arranged an inventive signaling gateway 108 which in this example has the function of both a signaling transfer point and a signaling gateway (STP/SG). Connected to the signaling gateway 108 in the TDM network 102 by means of a signaling link 118 is, for example, a mobile switching center (MSC) 106, which by means of signaling link 120 is connected to other network elements, such as a base station controller (BSC) (not shown). In the IP network 104 the signaling gateway 108 is connected by means of three M3UA connections 114A-C to an application server (AS) 110, in the present example a home location register (HLR), the application server 110 including by way of example three application server processes ($ASP_1$, $ASP_2$, $ASP_n$) 112A-C. Boxes 124, 126 and 128 show for MSC 106, STP/SG 108 and AS 110 the protocol hierarchy used in each case for the message transmission. In particular box 126 shows the signaling gateway function of the STP/SG 108, namely the conversion from MTP Level 1-3 to M3UA/SCTP/IP.

To permit screening of messages from the IP network 104 sent via the M3UA signaling relation 122B in the direction of the TDM network 102 and further switched there by means of traditional SS7 signaling relation 122A, the M3UA connections 114A-C are mapped to a pseudo linkset or IP linkset 116. Whereas in the traditional SS7 a linkset is defined by the set of all SS7 links that connect a network element directly to a particular, immediately adjacent network element and a traditional linkset is thus uniquely defined by its own point code and the point code of the immediate neighbor (Adjacent Destination Point Code, ADPC), the pseudo linkset or IP linkset 116 is defined as a set of all M3UA connections 114A-C between the signaling gateway 108 and the application server 110.

A pseudo linkset or IP linkset 116 is thus uniquely defined by the point code of the signaling gateway 108 and the routing key of the application server 110. The routing key describes a set of SS7 parameters and parameter values which uniquely lay down the scope of the traffic processed by the application server 110. The routing key can include in each case a range or an individual value of all or one of the following SS7 parameters: Service Information Octet (SIO), Destination Point Code (DPC), Origination Point Code (OPC), Circuit Identification Code (CIC). The routing key, i.e. the set of parameters and parameter values, is uniquely represented by a numerical value called a routing context.

The pseudo linksets or IP linksets defined in this way—as with SS7 linksets—are stored in databases of the signaling gateway 108 and hence can be used exactly like SS7 linksets as an entry point for linkset-based functions such as screening. Advantageously for the network operator, the same linkset-related rules, e.g. screening rules, can be used after the switch to SS7 over IP with M3UA as previously in a pure TDM environment.

For screening, starting from a linkset via which a message was received, parameters of the message determined by a sequence of so-called screening steps are examined (e.g. OPC, DPC, SIO, Affected Destination or Affected Point Code). On the basis of the parameters examined it is finally determined here whether the message in question should be forwarded in accordance with the routing rules or rejected as impermissible.

The procedure for screening is as follows: first the IP linkset 116 on which the message to be screened was received is determined. In conventional SS7 linksets the linkset can be determined uniquely by checking on which SS7 link the message was received, since the assignment of a link to precisely one linkset is unique. However, with M3UA one application server process 112 may be responsible for several application servers (not shown). However, this means that a message sent by an ASP 112A is sent via a first pseudo linkset if this ASP 112A works in the context of a first application server and is sent via a second pseudo linkset if the same ASP 112A works in the context of a second application server. However, in both cases the message reaches the STP/SG 108 via the same M3UA connection, so that no screening can be implemented on the basis of the M3UA connection, but only on the basis of the pseudo linksets defined here.

Which application server—and hence which pseudo linkset—the message is assigned to can be determined from the parameter routing context (RC) by using the above definition for the pseudo linksets. If an ASP is only responsible for precisely one AS, this assignment can also be made without the RC parameter.

For user part messages (e.g. ISUP or SCCP) the parameters to be screened can be read directly from the M3UA protocol data parameters of an M3UA data message. This relates to parameters such as Origination Point Code (OPC), Destination Point Code (DPC), Service Indicator (SI), Network Indicator (NI) or Signaling Link Selection (SLS). Other parameters, for example ISUP message type, can be determined from the user protocol data field of the M3UA message.

SS7 management messages must first be identified as such. SS7 management messages cannot always be identified by the service indicator (SI), since the M3UA management messages do not contain this. To screen messages with SI=0 (MTP Management), the screening process can preferably determine by the M3UA message class that this is an SS7 management message. The message class for SS7 management messages is fixed as "2" for M3UA. Since in the case of M3UA connections point-to-point connections are involved, these SS7 signaling network management (SSNM) messages have neither a DPC nor an OPC. If these parameters are to be subjected to screening, it is not possible to read these out from the message. Instead DPC and OPC can preferably be derived from the attributes of the pseudo linkset on the basis of the data of the pseudo linkset stored in the database.

Whereas for traditional SS7 messages screening based just on the so-called affected point codes (the point code or the network element affected by the message) is possible, since traditional SS7 messages each have a maximum of one affected point code, M3UA messages may relate to several affected point codes simultaneously. As an example, consider the message DUNA (Destination Unavailable) defined in RFC 3332, corresponding to a TFP message (Transfer Prohibited) or a TCP message (Transfer Cluster Prohibited) of MTP Level 3, and which can relate to 1 . . . n affected point codes:

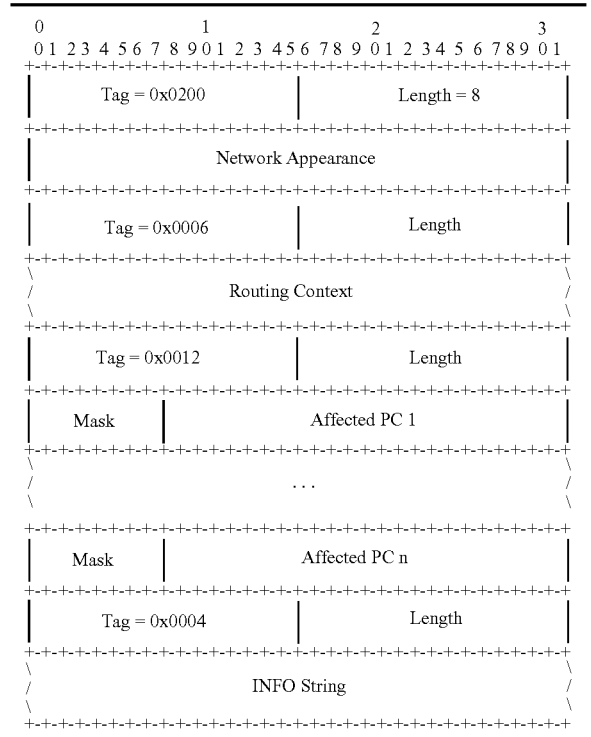

If screening rules for affected point codes are defined, it cannot be ascertained for the M3UA message how to proceed with the message, because several rules could be applicable simultaneously for the same message, which in some cases also produce conflicting results. In order nevertheless to screen M3UA messages with several affected point codes, the messages can be broken down into individual messages with just one affected point code each. Alternatively the messages can also be broken down into messages which in each case include a group of affected point codes for which the same screening restrictions apply.

Although the invention was described above with reference to the linkset-related function of "screening", the invention is not restricted to this application. Instead, the invention can advantageously be used for all linkset-related network functions.

The invention claimed is:

1. A method for performing linkset-related SS7 network functions based on messages in accordance with M3UA, the method comprising the following steps:
a) mapping M3UA connections to pseudo linksets, a pseudo linkset being defined as the set of M3UA connections between a signaling gateway and an application server and being uniquely determined by a set of SS7 parameters and parameter values, the parameters and parameter values uniquely laying down the scope of the traffic processed by the application server;
b) storing the data describing the pseudo linksets as linkset data in a database; and
c) performing the linkset-related SS7 network functions by determining an assigned pseudo linkset and by applying the SS7 network functions to the messages of the M3UA connection determined by the database, wherein
for user part messages the screening parameters Origination Point Code OPC, Destination Point Code DPC, Service Indicator SI, Network Indicator NI or Signaling Link Selection SLS are taken from the M3UA protocol data parameter of an M3UA message and all other screening parameters are taken from the user protocol data field of the M3UA message, and wherein for SS7 management messages determination takes place on the basis of the M3UA message class, and the Screening Parameter Origination Point Code OPC or Destination Point Code DPC are determined on the basis of the data of the pseudo linkset stored in the database.

2. The method according to claim 1, wherein the steps a) and b) are performed in a setup phase and the step c) is performed in an operating phase.

3. The method according to claim 1, wherein, if the messages are screened on the basis of the affected point code, an M3UA message that contains several affected point codes is first separated into individual M3UA messages, each of which contains only those affected point codes which are subject to an identical screening rule.

4. A signaling gateway adapted for performing linkset-related SS7 network functions based on messages according to M3UA, comprising:
means for mapping M3UA connections to pseudo linksets in a setup phase of the signaling gateway, a pseudo linkset being defined as the set of M3UA connections between a signaling gateway and an application server and being uniquely determined by a set of SS7 parameters and parameter values, the parameters and parameter values uniquely laying down the scope of the traffic processed by the application server;
database means for storing the data describing the pseudo linksets as linkset data;

means for implementing the linkset-related SS7 network functions by determining an assigned pseudo linkset and applying the SS7 network functions to the messages of the M3UA connection determined by the database means;

means for determining the screening parameters Origination Point Code OPC, Destination Point Code DPC, Service Indicator SI, Network Indicator NI or Signaling Link Selection SLS from the M3UA protocol data parameter of an M3UA message and all other screening parameters from the user protocol data field of the M3UA message; and means for determining the SS7 management messages on the basis of the M3UA message class plus means for determining the screening parameters Origination Point Code OPC or Destination Point Code DPC on the basis of the data of the pseudo linkset stored in the database.

5. The signaling gateway according to claim 4, wherein the means for determining the screening parameters are used for screening user part messages, and wherein the means for determining the SS7 management messages are used for screening SS7 management messages.

6. The signaling gateway according to claim 5, suitable for implementing the linkset-related SS7 network function of message screening, further comprising means for implementing screening of the messages on the basis of the affected point code, these means including means to separate an M3UA message containing several affected point codes into individual M3UA messages, each of which contains only those affected point codes that are subject to an identical screening rule.

7. The signaling gateway according to claim 4, further comprising: means for implementing screening of the messages on the basis of the affected point code, these means including means to separate an M3UA message containing several affected point codes into individual M3UA messages, each of which contains only those affected point codes that are subject to an identical screening rule.

8. The signaling gateway according to claim 4, suitable for implementing the linkset-related SS7 network function of message screening, further comprising means for implementing screening of the messages on the basis of the affected point code, these means including means to separate an M3UA message containing several affected point codes into individual M3UA messages, each of which contains only those affected point codes that are subject to an identical screening rule.

* * * * *